United States Patent [19]
Ichino

[11] Patent Number: 4,742,717
[45] Date of Patent: May 10, 1988

[54] GAS FLOW RATE MEASURING DEVICE

[75] Inventor: Kouji Ichino, Tokyo, Japan

[73] Assignee: Kaijo Denki Co., Ltd., Japan

[21] Appl. No.: 868,603

[22] Filed: May 30, 1986

[51] Int. Cl.⁴ .............................................. G01F 1/66
[52] U.S. Cl. ................ 73/861.18; 73/866.5; 73/861.28
[58] Field of Search .......... 73/861.18, 861.27, 861.28, 73/861.29, 24, 632, 866.5

[56] References Cited

U.S. PATENT DOCUMENTS 4,096,754  6/1978  Beveridge, Jr. et al. .......... 73/866.5

FOREIGN PATENT DOCUMENTS 0174813  10/1983  Japan ............................. 73/861.28
0194317  10/1985  Japan ............................. 73/861.18

OTHER PUBLICATIONS

Pedersen, et al., "A New Ultrasonic Flowmeter for the Natural Gas Industry", NBS Spec. Pub. 484, Gaithersburg, Proceedings (2/1977), pp. 293-318.

*Primary Examiner*—Charles A. Ruehl
*Attorney, Agent, or Firm*—Steinberg & Raskin

[57] ABSTRACT

A gas flow rate measuring device which is capable of removing a probe from a probe socket for inspection and/or replacement at the same time that while gas is flowing through a pipe. The gas flow rate measuring device includes a gas seal mechanism sealedly arranged between the probe socket and a probe coupler. The gas seal mechanism is formed therein with a hollow passage sufficient to allow the probe and a probe support to be moved therein and serves to hermetically seal the probe socket when the probe is removed from the probe socket. The gas flow rate measuring device may also include a ring member fitted on the probe support in a manner to be interposed between the probe support and the probe socket, arranged to prevent the transmission of a roundabout ultrasonic wave.

5 Claims, 3 Drawing Sheets

FIG. 6
FIG. 7
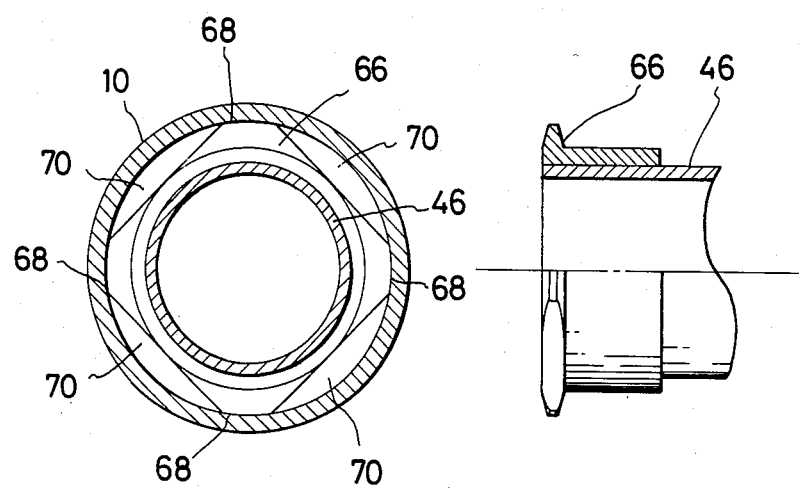
FIG. 8A
FIG. 8B
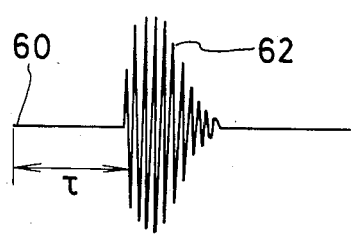
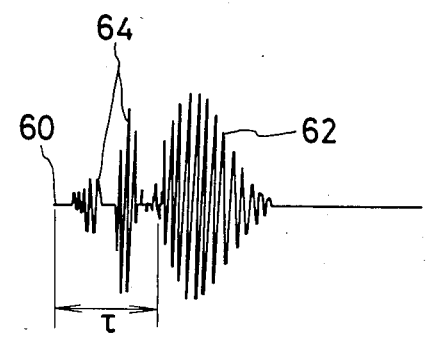

GAS FLOW RATE MEASURING DEVICE

BACKGROUND OF THE INVENTION

1. Field of the Invention

This invention relates to a device for measuring the flow rate of gas, and more particularly to a gas flow rate measuring device suitable for use for an ultrasonic gas flow meter utilizing ultrasonic waves.

2. Description of the Prior Art

In general, an ultrasonic gas flow meter, as shown in FIG. 1, is so constructed that a pair of cylindrical probe sockets 10 are mounted on a pipe 12 through which gas is to flow, in a manner obliquely opposite to each other at a suitable angle $\theta$ with respect to an axis of the pipe, each having an ultrasonic transreceiver body (hereinafter referred to as "probe") 14 provided therein in a manner to slightly project into an inner surface of the pipe 12. The flow rate of gas is measured by causing the probes 14 to alternately carry out the transmission and reception of ultrasonic waves in order to measure propagation times t1 and t2 in the forward and backward directions with respect to the flow of gas, seeking the following equations (1) and (2)

$$t1 = L/C + V\cos\theta \quad (1)$$

$$t2 = L/C - V\cos\theta \quad (2),$$

calculating the following equation (3) from the so-obtained equations (1) and (2)

$$V = \tfrac{1}{2}\cos\theta(1/t1 - 1/t2) \quad (3),$$

and then calculating the flow rate of gas with reference to a sectional area of the pipe, wherein V = flow velocity (m/s),
L = distance between transreceivers (m)
$\theta$ = angle between axis of propagation of ultrasonic wave and axis of pipe (degree), and
C = velocity of propagation of ultrasonic wave in still gas (m/s).

FIG. 2 shows a typical structure of an ultrasonic transreceiver or gas flow rate measuring device which has been conventionally used for an ultrasonic gas flow meter. In FIG. 2, reference numeral 10 designates a socket, 12 designates a pipe through which gas flows, and 14 designates a probe. The probe 14 is mounted in the socket 10 by fitting a flange 16 provided on a probe support member 18 in a seat member 20 through a seal ring 22 and then fixing the flange 16 in the socket 10 by means of a cap nut 24.

The gas flow rate measuring device shown in FIG. 2 is also provided with a probe coupler 26. Reference numeral 28 designates a protection tube and 30 indicates a cable which is inserted through the probe support member 18 and connected to the probe 14.

In view of the above-described construction of the conventional ultrasonic transreceiver, it will be readily understood that the removal of the probe 14 from the socket 10 for the purpose of the inspection or replacement of the probe causes gas flowing through the pipe 12 to flow out through the socket 10. Thus, the inspection or replacement of the probe 14 requires the feeding of gas through the pipe to be stopped. Alternatively, it is required that the pipe 12 be provided with a bypass for flowing gas there through during the inspection or replacement.

However, the stopping of the gas flow through the pipe during the inspection or replacement of the probe is substantially impossible, because it causes the shutdown or nonoperation of a manufacturing line.

Also, the provision of such a bypass in the pipe 12 increases the manufacturing cost. This is particularly true when the pipe has a large diameter. Further, the bypass has the additional disadvantage of disturbing the distribution of velocity of gas flowing through the pipe and generating noise irrespective of the diameter of the pipe 10, thereby deteriorating the accuracy of measurement and causing the malfunction of the gas flow rate measuring device.

Accordingly, it would be highly desirable to develop a gas flow rate measuring device which is able to carry out the inspection and replacement of a probe as desired without stopping the flow of gas through a pipe or providing the pipe with any bypass.

SUMMARY OF THE INVENTION

Briefly speaking, in accordance with the present invention, a gas flow rate measuring device is provided which includes a probe socket, a probe detachably received in the socket, a probe coupler and a probe support connected between the probe and the probe coupler.

A featured construction of the present invention is that a gas seal mechanism is sealedly arranged between the probe socket and the probe coupler. This probe coupler is formed with a hollow passage sufficient to allow the probe and probe support to be moved therein. The gas seal mechanism serves to hermetically seal the probe socket when the probe is removed through the probe support from the probe socket.

The gas seal mechanism maybe comprised of a valve unit sealedly fixedly connected at one end thereof to the probe socket and provided with a valve for selectively closing the passage of the gas seal mechanism and a seal unit detachably connected to the other end of the valve unit so that it may be removed from the valve unit together with the probe and probe support when the probe is removed form the socket.

The present invention may have another featured construction: ring means that is fitted on the probe support in a manner to be interposed between the probe support and the probe socket. The ring means are formed into a shape sufficient to allow at least three contacts to be carried out between an inner surface of the socket and the probe support. Also, the ring means allow spaces to be defined between the ring means and the inner surface of the probe socket which are sufficient enough to prevent the collection of water therebetween.

Accordingly, it is an object of the present invention to provide a gas flow rate measuring device which is capable of carrying out the inspection or replacement of a probe at any time in a simple manner.

It is another object of the present invention to provide a gas flow rate measuring device which is capable of achieving the inspection or replacement of a probe at any time without stopping the flow of gas through a pipe or providing the pipe with any bypass.

It is a further object of the present invention to provide a gas flow rate measuring device which is capable of accomplishing the inspection or replacement of a probe even while flowing gas through a pipe.

It is still another object of the present invention to provide a gas flow rate measuring device which is capable of accomplishing the above-described objects with a simple structure.

It is yet another object of the present invention to provide a gas flow rate measuring device which is capable of accurately carrying out the measuring of a gas flow rate.

It is still a further object of the present invention to provide a gas flow rate measuring device which is capable of substantially preventing the generation of a roundabout ultrasonic wave or sound wave which hinders the measuring of a gas flow rate.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is made to the following description taken in connection with the accompanying drawings in which like reference numerals designate like or corresponding parts throughout, wherein:

FIG. 6 is a cross sectional view showing another embodiment of a gas flow rate measuring device according to the present invention;

FIG. 7 is a side view, partly in section, showing an essential part of the gas flow rate measuring device shown in FIG. 6; and FIGS. 8A and 8B are each a wave form showing a received wave signal in which FIG. 8A shows a wave form of a ultrasonic wave free of a roundabout ultrasonic wave and FIG. 8B shows that of a sound wave in which a roundabout sound wave is contained.

DETAILED DESCRIPTION OF THE PREFERRED EMBODIMENTS

Now, a gas flow rate measuring device according to the present invention will be described hereinafter with reference to FIGS. 3 to 8.

Figure 3:
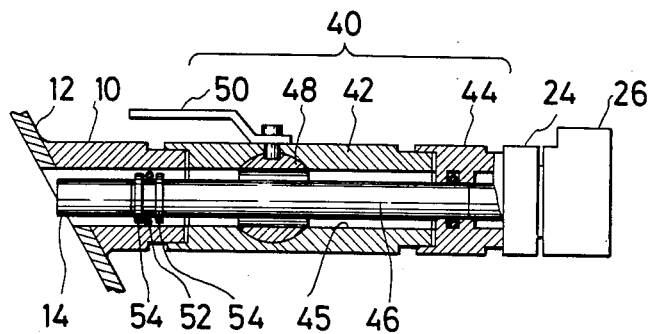
FIG. 3 is a vertical sectional view showing an embodiment of a gas flow rate measuring device according to the present invention.

FIG. 3 shows an embodiment of a gas flow rate measuring device according to the present invention. The illustrated embodiment employs a gas seal mechanism as means for preventing gas which is flowing through a pipe from outwardly leaking from the measuring device when a probe is removed from a probe socket for replacement and/or inspection.

In FIG. 3, reference numeral 10 designates a probe socket, 12 is a pipe through which gas flows, and 14 is a probe. Also, reference numerals 24 and 26 indicate a cap nut and a coupler, respectively.

Figure 2:
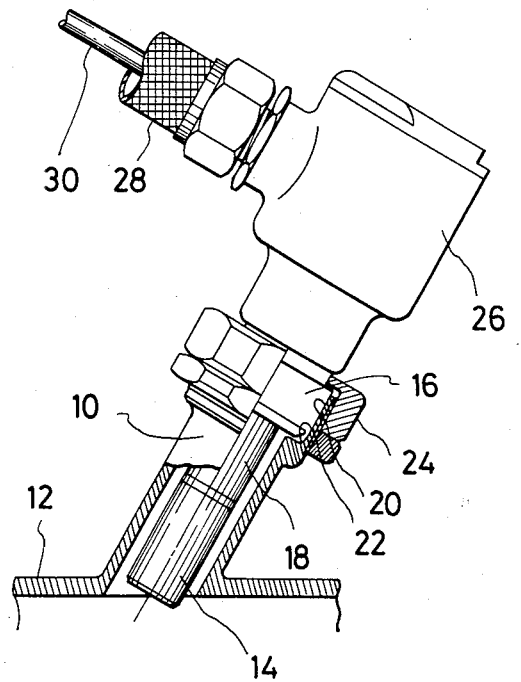
FIG. 2 is a front elevation view, partly in section showing a conventional gas flow rate measuring device.

The illustrated embodiment includes a gas seal mechanism generally designated by reference numeral 40. In the embodiment, the gas seal mechanism 40 comprises a valve unit 42 sealedly and fixedly connected at one end thereof to the probe socket 10 and a seal unit 44 connected between the other end of the valve unit 42 and the coupler 26. The gas seal mechanism 40 is formed therein with a hollow passage 45 through which a probe support 46 for connecting the probe 14 and the coupler 26 therethrough to each other is inserted into the gas seal mechanism 40, so that the probe 14 and probe support 46 may be removed through the passage 45 from the probe socket 10 as desired. The probe support 46 is formed to have a length larger than the probe support member 18 in the conventional flow rate measuring device shown in FIG. 2. Also the seal unit 44 is connected to the valve unit 42 in such a manner as to be detachable from the valve unit. The valve unit 42 includes a valve 48 for selectively closing the passage 45, which is operated by means of a handle 50.

The manner of operation of the gas flow rate measuring device of the illustrated embodiment will be described hereinafter with reference to FIGS. 3 to 5.

Figure 4:
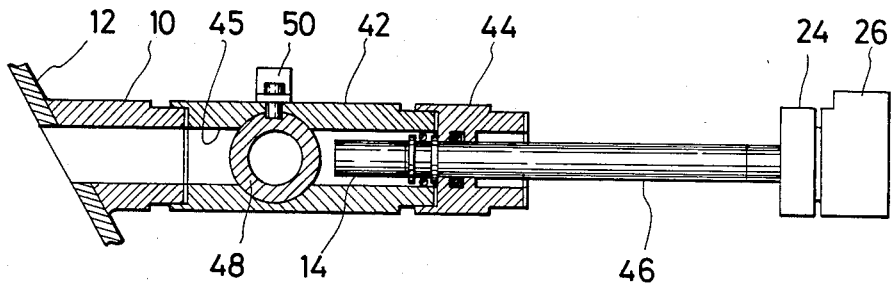
FIGS. 4 and 5 are each a vertical sectional view showing the manner of operation of the gas flow rate measuring device shown in FIG. 3.
Figure 5:
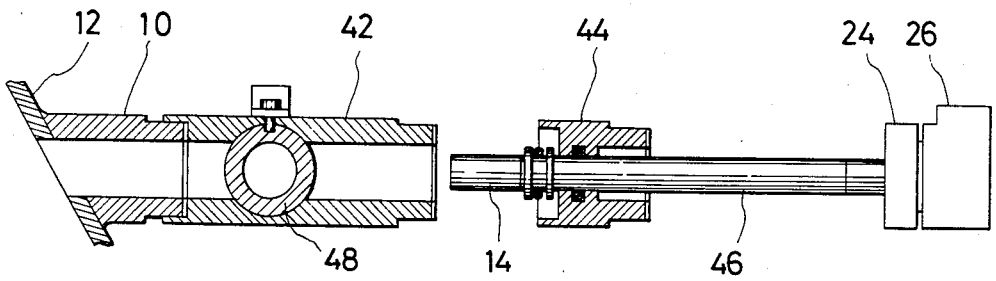

In the embodiment shown in FIG. 3, which is constructed so that the gas seal mechanism 40 is provided between the socket 10 and the probe coupler 26, the removal of the probe 14 from the probe socket 10 for inspection and/or replacement is carried out by releasing the cap nut 24; pulling up the probe 14 and probe support 46 together with the coupler 26 to a position above the valve 48 of the valve unit 42 as shown in FIG. 4; closing the valve 48 by means of the handle 50 to seal the probe socket 10 as shown in FIG. 4; and then detaching the seal unit 44 from the valve unit 42 to remove the probe 14 and the probe support 46 together with the seal unit 44 from the valve unit 42 as shown in FIG. 5.

Thus, it will be noted that the embodiment shown in FIG. 3 allows the probe 14 to be removed without any trouble while at the same time gas is flowing through the pipe 12.

FIGS. 6 and 7 illustrate another embodiment of a gas flow rate measuring device according to the present invention. The embodiment shown in FIGS. 6 and 7 is adapted to further improve the above-described embodiment shown in FIG. 3.

More particularly, in the embodiment of FIG. 3, the gas seal mechanism 40 is interposedly provided between the probe socket 10 and the probe coupler 26 as described above. Such construction results in the gas flow rate measuring device being greatly increased in length, making it necessary to interpose the probe support 46 between the probe 14 and the probe coupler 26 to connect the both together. Such an elongated combination of the probe 14 and probe support 46 is supported at only the probe coupler side. Such a support manner causes vibration to be transmitted from any vibration source, such as a blower, a pump or the like to the probe 14 through the pipe 12 and a piping connected thereto, resulting in the probe 14 being vibrated. For the purpose of eliminating such a problem it has been proposed to fit an O-ring 52 on one end of the probe support 46 connected to the probe 14 in a manner to be contacted with an inner wall of the probe socket 10, as shown in FIG. 3. Also, the probe support 46 is provided with a pair of circumferential projections 54 for securely holding the O-ring 52 therebetween.

In general, gas flowing through the pipe 12 contains moisture. For example, usually gas as well as steam of high pressure and temperature has a considerable amount of moisture, because it is forcibly passed through a water filter for removal of dust, contaminants, refuse and the like therefrom.

Accordingly, a decrease in the temperature of gas flowing through the pipe 12 to dew point causes water droplets to be formed in large amounts. For example, when the gas of such a high moisture content is decreased in temperature due to contact with the probe 14 or probe support 46, the moisture is adhered thereto in the form of water droplets. The so-adhered water droplets often penetrate into a gap between the O-ring 52 and the inner surface of the socket 10 and into gaps between the projections 54 and the inner surface of the socket 10 due to a capillary phenomenon.

Such penetration of the water into the gaps causes the following disadvantages.

Figure 1:
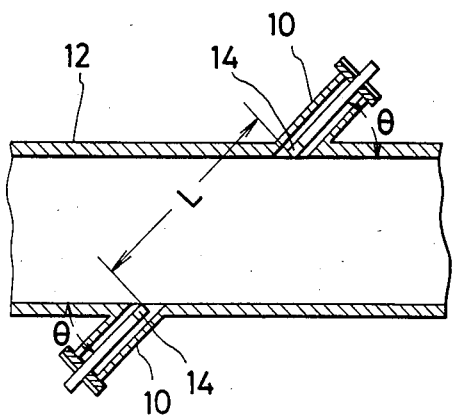
FIG. 1 is a schematic vertical sectional view showing the general construction of an ultrasonic gas flow meter.

When an ultrasonic wave is generated from the probe 14, ultrasonic waves transmitted to a probe (not shown) arranged opposite to the probe 14 on the pipe 12 in a manner, for example, as shown in FIG. 1, include, in addition to a normal ultrasonic wave transmitted directly from the probe 14 through gas flowing through the pipe 12, an ultrasonic wave transmitted from the probe 14 through the O-ring 52, projections 54 and water collected in the above-described gaps, to the probe socket 10 and then through the wall of the pipe 12 to a socket of the opposite probe (not shown); and an ultrasonic wave transmitted from the water through the O-ring 52 and/or projections 54 to the opposite probe (not shown). Such ultrasonic waves are referred herein to as "roundabout ultrasonic waves". Such roundabout ultrasonic waves reach the opposite probe (not shown) in a short period of time as compared with the normal ultrasonic wave transmitted via gas flowing through the pipe 12, because they are transmitted through the probe socket 10 and pipe 12 made of a metal material. This is an obstacle to the measuring of the propagation time of an ultrasonic wave through gas, as shown in FIGS. 8A and 8B in which reference numeral 60 designates the start of supply of an ultrasonic wave, 62 designates a wave form of a signal received, and 64 a wave form of a roundabout ultrasonic wave. FIG. 8A shows a wave form of an ultrasonic wave free of any roundabout ultrasonic wave, wherein the time of propagation of the sound wave via gas flowing through the pipe 12 is indicated by $\tau$. FIG. 8B clearly reveals that a roundabout ultrasonic wave reaches the opposite probe before the time $\tau$ elapses.

A gas flow rate measuring device of the embodiment shown in FIGS. 6 and 7 is adapted to prevent the measuring of a gas flow rate from being disturbed due to a roundabout ultrasonic wave.

For this purpose, the device of the illustrated embodiment, as shown in FIGS. 6 and 7, includes ring means 66 formed of a flexible material such as synthetic resin or the like and fitted on a probe support 46. FIGS. 6 and 7 each show the secure fitting of the probe support 46 in a probe socket 10 through the ring means 66 fitted on the probe support 46. The ring means 66 has an outer periphery provided with at least three contact sections 68 through which the ring means contact an inner surface of the probe socket 10 while defining large spaces 70 between the ring means 66 and the socket 10 which are of sufficient size to prevent water from being collected between the ring means 66 and the probe socket 10 due to a capillary action, thereby preventing the ring means 66 from being contacted by the probe socket 46 through the water. Accordingly, the ring means 66 may be formed into, for example, a polygonal shape.

The ring means 66, as described above, are made of a flexible material such as synthetic resin. In the illustrated embodiment, it may be formed of tetrafluoroethylene. Accordingly, when the ring means 66 which are formed to have a somewhat smaller than or substantially the same diameter as that of the probe supporter 46 are forcibly fitted on the supporter 46, the ring means can be securely fixed with respect to the supporter 46 without the provision of such projections 54 as shown in FIG. 3. Such construction substantially prevents the formation of any gap between the probe socket 10 and the probe support 46 sufficient enough to allow water to be collected therein, because the ring means 66 are contacted through at least three contact sections 68 by the inner surface of the probe socket 10 to define the large spaces 70 between the ring means 66 and the inner surface of the socket 10. Further, the ring means 66 are formed of a flexible material such as synthetic resin, so that the ring means may highly attenuate an ultrasonic wave transmitted therethrough as compared with water and metal. Thus, it will be noted that the embodiment shown in FIGS. 6 and 7 highly reduces or substantially eliminates a roundabout ultrasonic wave transmitted from the probe 14 to the socket 10 or from the socket to the probe, thereby effectively ensuring that the measuring of a gas flow rate will not be hindered by the roundabout ultrasonic wave.

It will thus be seen that the objects set forth above, amoung those made apparent from the preceding description, are efficiently attained and, since certain changes may be made in the above construction without departing from the spirit and scope of the invention, it is intended that all matter contained in the above description or shown in the accompanying drawings be interpreted as illustrative and not as limiting in any sense.

What is claimed is:

1. A gas flow rate measuring device comprising:
   a probe socket arranged to project through a wall of a pipe through which gas is to flow;
   a probe arranged in said probe socket to carry out transmission and reception of an ultrasonic wave;
   a probe support fixedly connected at one end thereof to said probe;
   a probe coupler connected to the other end of said probe support; and
   a gas seal mechanism sealedly arranged between said probe socket and said probe coupler and having a hollow passage formed therein which permits said probe and probe support to move therein;
   said gas seal mechanism hermetically sealing said probe socket when said probe is removed from said probe socket; and
   ring means fitted on said probe support, said ring means being formed of a flexible material into a shape defining at least three contact sections through which said ring means contact an inner surface of said probe socket and defining spaces between an outer periphery of said ring means and said inner surface of said probe socket.

2. A gas flow rate measuring device as defined in claim 1, wherein said ring means are formed of a synthetic resin.

3. A gas flow rate measuring device as defined in claim 1, wherein said ring means are formed into a substantially rectangular shape.

4. A gas flow rate measuring device comprising:

a probe socket arranged to project through a wall of a pipe through which gas is to flow;

a probe arranged in said probe socket to carry out transmission and reception of an ultrasonic wave;

a probe support fixedly connected at one end thereof to said probe, a probe coupler connected to the other end of said probe support;

a valve unit sealedly fixedly connected at one end thereof to said socket, said valve unit having a hollow passage formed therein which permits said probe and probe support to move therein and being provided with a valve for selectively closing said passage;

a seal unit detachably connected at one end thereof to the other end of said valve unit and at the other end thereof to said probe coupler so that said seal unit may be removed from said valve unit together with said probe and probe support when said probe is removed from said probe socket; and ring means fitted on said probe support so as to be interposed between said probe support and an inner surface of said socket, said ring means being formed of a flexible material into a shape defining at least three contact sections through which said ring means contact said inner surface of said socket and defining spaces to prevent the collection of water between said ring means and said inner surface of said socket.

5. A gas flow rate measuring device as defined in claim 4, further including a handle for operating said valve of said valve unit.

* * * * *